(12) United States Patent
Oyagi et al.

(10) Patent No.: US 6,199,193 B1
(45) Date of Patent: *Mar. 6, 2001

(54) METHOD AND SYSTEM FOR SOFTWARE DEVELOPMENT AND SOFTWARE DESIGN EVALUATION SERVER

(75) Inventors: Makoto Oyagi; Shoichi Ota, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,357

(22) Filed: Sep. 16, 1997

(30) Foreign Application Priority Data

Mar. 18, 1997 (JP) .................................................... 9-064633

(51) Int. Cl.$^7$ ........................................................ G06F 9/45
(52) U.S. Cl. ................................................................ 717/1
(58) Field of Search ............................. 395/500, 468.01, 395/12, 701; 717/1, 3; 706/59

(56) References Cited

U.S. PATENT DOCUMENTS

| | | | | |
|---|---|---|---|---|
| 4,809,170 | * | 2/1989 | Leblang et al. ........................ | 395/703 |
| 5,008,853 | * | 4/1991 | Bly et al. ............................... | 345/331 |
| 5,168,563 | * | 12/1992 | Shenoy et al. ......................... | 395/500 |
| 5,220,657 | * | 6/1993 | Bly et al. ............................... | 711/152 |
| 5,247,651 | * | 9/1993 | Clarisse ................................... | 395/500 |
| 5,269,014 | * | 12/1993 | Ogino ..................................... | 395/500 |
| 5,369,778 | * | 11/1994 | Soucie et al. .......................... | 707/103 |
| 5,412,758 | * | 5/1995 | Srikanth et al. ........................ | 706/59 |
| 5,421,012 | * | 5/1995 | Khoyi et al. ........................... | 709/107 |
| 5,446,842 | * | 8/1995 | Schaeffer et al. ...................... | 709/205 |
| 5,572,430 | * | 11/1996 | Akasaka et al. ................. | 364/468.01 |
| 5,664,158 | * | 9/1997 | Larimer ................................. | 395/500 |
| 5,696,906 | * | 12/1997 | Peters et al. ........................... | 705/34 |
| 5,715,314 | * | 2/1998 | Payne et al. ........................... | 380/24 |
| 5,754,738 | * | 5/1998 | Saucedo et al. ....................... | 706/11 |
| 5,799,318 | * | 8/1998 | Cardinal et al. ...................... | 707/104 |

* cited by examiner

*Primary Examiner*—Tariq R. Hatiz
*Assistant Examiner*—Chameli C. Das
(74) *Attorney, Agent, or Firm*—Staas & Halsey LLP

(57) ABSTRACT

A software design evaluation server that facilitates end-user participation in a software development process so as to prevent any defects in functional specifications from remaining unsolved in the final version of the application that is developed. A comment-space inclusive prototype presentation unit, as part of the server, generates a prototype of the application under development. This prototype has a comment space added that allows the user to write his/her comments and suggestions about features of display screens or data items included in the screens. The comment-space inclusive prototype presentation unit sends such a prototype with a comment space to the client computer for user review purposes. An identification data storage unit stores information for identifying the screens and items, as well as holding information for identifying development engineers involved in the software development. A user feedback distribution unit receives the user's comments and suggestions about the screens and/or items of the prototype through the network, and distributes the received comments and suggestions to relevant development engineers, based on the identification data stored in the identification data storage unit.

14 Claims, 27 Drawing Sheets

FIG. 5

20a SCREEN

PERSONNEL INFORMATION MANAGEMENT SYSTEM (9) NEXT PAGE   (10) PREVIOUS PAGE   (11) EXIT (1) FACE PICTURE
(2) NAME 1
(3) NAME 2
(4) EMPLOYEE NUMBER
(5) DATE OF BIRTH
(6) ADDRESS
(7) PHONE NUMBER
(8) E-MAIL ADDRESS

11a PROTOTYPE

SCREEN ID: 0006   SCREEN NAME: PERSONAL INFORMATION

| ITEM ID | CHECK BOX | COMMENTS |
|---------|-----------|----------|
| (1) 001 | ○ OK  ● NG | USE A FULL-LENGTH PHOTOGRAPH |
| (2) 002 | ● OK  ○ NG | |
| (3) 003 | ● OK  ○ NG | |
| (4) 004 | ● OK  ○ NG | |
| -- | -- | -- |

11b COMMENT SPACE

DEVELOPMENT TEAM MANAGEMENT TABLE 12b

| REFERENCE NUMBER | SCREEN ID | DEVELOPER ID |
|---|---|---|
| 00001 | 0001 | A0001 |
| 00001 | 0002 | A0001 |
| 00001 | 0003 | A0003 |
| 00001 | 0004 | B0010 |
| 00001 | 0005 | B0010 |
| 00001 | 0006 | B0002 |

12a USER FEEDBACK TABLE

| REFERENCE NUMBER | SCREEN ID | ITEM ID | COMMENTS |
|---|---|---|---|
| 00001 | 0001 | 001 | |
| 00001 | 0002 | 001 | |
| 00001 | 0003 | 005 | |
| 00001 | 0003 | 009 | |
| 00001 | 0004 | 003 | |
| 00001 | 0005 | 006 | |
| 00001 | 0006 | 001 | USE A FULL-LENGTH PHOTOGRAPH |

51a SIMILAR CASE TABLE

| REFERENCE NUMBER | INDUSTRY CLASSIFI-CATION | JOB CATEGORY | APPLICATION SYSTEM NAME | SOFTWARE INSTRUMENT |
|---|---|---|---|---|
| 00001 | MANU-FACTURING | PERSONNEL AFFAIRS | PERSONNEL MANAGEMENT | Access |
| 00002 | DISTRI-BUTION | SALES | SALES MANAGEMENT | Notes |
| ⋮ | ⋮ | ⋮ | ⋮ | ⋮ |

FIG. 13

51b SIMILAR CASE TABLE

| REFERENCE NUMBER | SCREEN ID | SCREEN NAME |
|---|---|---|
| 00001 | 0005 | SUMMARY INFORMATION |
| 00001 | 0006 | INDIVIDUAL INFORMATION |
| ⋮ | ⋮ | ⋮ |
| 00002 | 0001 | SALES ACHIEVEMENT GRAPH |
| ⋮ | ⋮ | ⋮ |

FIG. 14

51c SIMILAR CASE TABLE

| REFERENCE NUMBER | SCREEN ID | ITEM ID | ITEM NAME | PROPERTY #1 | PROPERTY #2 | ... |
|---|---|---|---|---|---|---|
| 00001 | 0006 | 001 | FACE PICTURE | MONOCHROME | | |
| 00001 | 0006 | 002 | NAME | JAPANESE | GOTHIC FONT | |
| ------ | ------ | ------ | ------ | ------ | ------ | ------ |

FIG. 15

51d DATA ITEM TABLE

| REFERENCE NUMBER | APPLICATION SYSTEM NAME | DATA ITEM ID | DATA ITEM NAME | PROPERTY #1 (LENGTH) | PROPERTY #2 | CASE RELATED |
|---|---|---|---|---|---|---|
| 01 | PERSONNEL MANAGEMENT | 0001 | NAME | 20 | | 00020 |
| 01 | PERSONNEL MANAGEMENT | 0002 | NAME | 30 | | 00001 |
| | | 0003 | NAME | 40 | | 00040 |
| | | 0004 | EMPLOYEE NUMBER | 10 | | 00020 |
| | | 0005 | PERSONNEL ID | 10 | | 00001 |
| | | 0006 | MEMBER ID | 16 | | 00100 |
| | | 0007 | ASSIGNMENT | 20 | | 00001 |
| | | 0008 | SECTION | 40 | | 00040 |
| | | --- | --- | --- | | --- |
| 02 | PRODUCT MANAGEMENT | 0001 | PRODUCT CODE | 6 | | 00003 |
| | | 0002 | PRODUCT CODE | 12 | | 00010 |
| | | 0003 | PRODUCT NAME | 40 | | 00003 |
| --- | --- | --- | --- | --- | | --- |

FIG. 16

52a SOFTWARE SPECIFICATION TABLE

| REFERENCE NUMBER | BASE IMPLE-MENTATION #1 | BASE IMPLE-MENTATION #2 | ------ |
|---|---|---|---|
| 000001 | 000001 | 000020 | ---------- |
| ---------- | ---------- | ---------- | ---------- |

SOFTWARE SPECIFICATION TABLE 52b

| REFERENCE NUMBER | BASE IMPLEMENTATION NUMBER | SCREEN ID | ITEM ID | COMMENTS |
|---|---|---|---|---|
| 000001 | 000001 | 0001 | 001 | CHANGE TITLE |
| 000001 | 000001 | 0001 | 002 | NEW BUTTON |
| 000001 | 000001 | 0006 | 001 | USE A FULL-LENGTH PHOTOGRAPH |
| | 000020 | 0002 | 003 | |
| | 000020 | 0002 | 004 | |
| | 000020 | 0002 | 008 | NEW ITEM |
| | 000020 | 0002 | 009 | ---- |

| REFERENCE NUMBER | APPLICATION SYSTEM NAME | SOFTWARE INSTRUMENT | DATABASE USED | NUMBER OF USERS |
|---|---|---|---|---|
| 000001 | PERSONNEL INFORMATION MANAGEMENT SYSTEM | Access | Oracle | 10 |

52c SOFTWARE SPECIFICATION TABLE

SEARCH CONDITION ENTRY #2 — 120

- ☐ HEADQUARTERS
- ☐ SHINJUKU OFFICE
- ☐ SHINAGAWA OFFICE
- ☐ SHIBUYA BRANCH
- ☐ YOKOHAMA BRANCH
- ☐ CHIBA BRANCH
- ☐ NAGOYA BRANCH
- ☐ OSAKA BRANCH
- ☐ TAMACHI FACTORY
- ☐ IBARAGI FACTORY
- ☐ FUKUSHIMA FACTORY
- ☐ IWATE FACTORY
- ☐ AICHI FACTORY

121

[OK] 122   [SELECT ALL] 123   [RESET] 124

| SUMMARY OF MATCHES | | | | | |
|---|---|---|---|---|---|
| PERSONAL ID CODE | NAME | LOCATION | DEPARTMENT | POSITION | DATE OF EMPLOYMENT |
| 1020 | OTA MASAO | HEADQUARTERS | GENERAL AFFAIRS DEPT. | STAFF | APRIL 1, 1987 |
| 1021 | TANAKA HIROSHI | HEADQUARTERS | GENERAL AFFAIRS DEPT. | STAFF | APRIL 1, 1987 |
| 1023 | SUZUKI TARO | HEADQUARTERS | FINANCIAL DEPT. | STAFF | APRIL 1, 1985 |
| 1025 | SATO MASAKO | SHINJUKU OFFICE | FIRST SALES DEPT. | STAFF | APRIL 1, 1984 |
| 1120 | YAMAMOTO ICHIRO | YOKOHAMA BRANCH | FIRST SALES DEPT. | STAFF | APRIL 1, 1986 |
| 1126 | TAKAHASHI KYOKO | CHIBA BRANCH | SECOND SALES DEPT. | STAFF | APRIL 1, 1982 |
| 1129 | YAMADA YOSHIO | OSAKA BRANCH | FIRST SALES DEPT. | STAFF | APRIL 1, 1985 |
| 1510 | UEDA KAZUO | AICHI FACTORY | PRODUCT TEST DEPT. | STAFF | APRIL 1, 1989 |

[ PREVIOUS PAGE ]  [ NEXT PAGE ]  [ DETAILS ]

FIG. 26

| PERSONNEL DATABASE 150a | NEXT PAGE 151 | PREVIOUS PAGE 152 | PRINT 153 | SUMMARY 154 | |
|---|---|---|---|---|---|
| FACE PICTURE | PERSONAL ID CODE | 1021 | | DATE OF BIRTH | AUGUST 8, 1964 |
| | NAME 1 | TANAKA HIROSHI | | DATE OF EM-PLOYMENT | APRIL 1, 1987 |
| | NAME 2 | 田中 宏 | | | |
| | ADDRESS | 1231-26, KOTO-KU, TOKYO | | | |
| | DESCRIPTION | | BIRTHPLACE | KANAGAWA PREF. | |
| PRESENT POSITION | HEADQUARTERS | | MEMBERSHIP | REGULAR MEMBER | |
| LOCATION | GENERAL AFFAIRS DEPT. | | EMPLOYMENT | REGULAR EMPLOYMENT | |
| ASSIGNMENT | STAFF | | ANNUITY NO. | x x x x x x x x x | |
| MANAGERIAL POSITION | REGULAR STAFF A | | HEALTH IN-SURANCE NO. | x x x x x x x x x | |
| FUNCTION-AL CLASS | | | | | |
| REMARKS | | | | | |

FIG. 27

METHOD AND SYSTEM FOR SOFTWARE DEVELOPMENT AND SOFTWARE DESIGN EVALUATION SERVER

BACKGROUND OF THE INVENTION

1. Field of the Invention

The present invention relates to a method and system for software development and a software design evaluation server therefor. More particularly, the present invention relates to a method and system for software development which allows users to verify the functional specifications during the development process, and also to a software design evaluation server which facilitates user participation in a software development process to verify the functional specifications of an application under development.

2. Description of the Related Art

In the context of business process reengineering (BPR) including analysis and redesign of business rules and practices, many organizations recognize the necessity of reconfiguration and redeployment of their business computing systems to adapt to the new business processes. Information system departments in such organizations are requested to put their efforts to improvement of productivity in the software development processes, while the end users are also encouraged to develop a system by themselves according to their own needs.

In reality, however, actual user needs are so diversified that information system departments are overwhelmed by ever-increasing development work backlogs. The delivery of maximum efficiency in software development is therefore an urgent requirement to be achieved.

With respect to the software development methodologies, a conventional "waterfall" process has been popularly used to develop business application programs, in which each development phase strictly follows its predecessor. That is, a software development process starts with repeated discussions between the user and developer so as to clarify the user's requirements and finalize the product target specifications, and then proceeds to the next phases such as design, coding, and test in a stepwise manner.

Today, prototyping has been widely introduced, on the other hand, as an integral part of a software development process. In this methodology, the users are requested to evaluate a prototype of an application under development and provide their comments and suggestions on the features presently implemented therein, thus allowing the developer to modify and improve the program in a timely manner according to the user's feedback. The prototyping methodology promotes heightened user involvement in the product definition and development processes, while ensuring satisfaction with the final application.

The above-described software development with prototyping phases requires users to participate in the system development from its early stage to achieve a high quality level in the final product. This user participation, however, entails movement of human resources and/or instruments from one place to another, thus imposing some burdens on both users and developers.

Another problem is availability of users. They are not always ready for frequent participation in the system development. Insufficient user participation, however, reduces the opportunities for in-process check and correction, which may result in some indefinite functional specifications remaining unclarified or necessary features left missing in the final product.

SUMMARY OF THE INVENTION

Taking the above into consideration, a first object of the present invention is to provide a convenient software design evaluation server which ensures that all functions requested by the user be fully implemented in the application under development.

To accomplish the first object, according to the present invention, there is provided a software design evaluation server, coupled to a client computer via a network, which allows a user to make a review of functional specifications of an application during a development process thereof. This software design evaluation server comprises: (a) comment-space inclusive prototype presentation means for generating a comment-space inclusive prototype by adding a comment space to a prototype of the application under development to allow the user to write comments and suggestions about features of a screen or data items included in the screen as part of the prototype, and for sending the comment-space inclusive prototype to the client computer for presentation to the user; (b) identification data storage means for storing information for identifying the screen and the items, as well as information for identifying development engineers involved in the development of the application; and (c) user feedback distribution means for receiving from the user the comments and suggestions about the screens and/or the items from the user through the network, and distributing the received comments and suggestions to the development engineers, based on the information stored in said identification data storage means.

A second object of the present invention is to provide a convenient software development method which assures that all functions requested by the user will be implemented in the application under development.

To accomplish the second object, according to the present invention, there is provided a software development method which allows a user to make a review of functional specifications of an application during a development process thereof. This software development method comprises the steps of: (a) presenting a prototype of the application under development to the user over a network; (b) sending the user's comments and suggestions about the prototype over the network; (c) correcting the application under development so that the user's comments and suggestions be reflected therein, whereby the development process advances toward a final version of the application; and (d) delivering the final version of the application to the user via the network.

A third object of the present invention is to provide a convenient software development system which assures that all functions requested by the user will be implemented in the application under development.

To accomplish the third object, according to the present invention, there is provided a software development system which allows a user to make a review of functional specifications of an application during a development process thereof.

This software development system comprises: (a) a client computer comprising (a1) software development order means for placing an order for software development via a network, (a2) prototype display means for displaying a prototype of the application under development on a monitor screen, and (a3) user feedback notification means for sending comments and suggestions concerning functional specifications for the prototype over the network; and (b) a server comprising (b1) similar case searching means for accepting the software development order from the user and retrieving a similar case that relates to the ordered software development, (b2) process content determination means for determining contents of the application, based on the similar case that has been retrieved by the similar case searching means, (b3) quotation means for issuing a price quotation of the software development, (b4) authentication key assignment means for giving an authentication key to the user, when the user has accepted the price quotation and a software development contract has been made, (b5) prototype presentation means for presenting the prototype to the user via the network, and (b6) user feedback distribution means for distributing the comments and suggestions received from the client computer to development engineers in charge of the software development.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing an example of a screen presented by a comment-space inclusive prototype presentation unit;

FIG. 13 is a diagram showing a similar case table;

FIG. 14 is a diagram showing another similar case table;

FIG. 15 is a diagram showing still another similar case table;

FIG. 16 is a diagram showing a data item table;

FIG. 17 is a diagram showing a software specification table;

FIG. 18 is a diagram showing another software specification table;

FIG. 19 is a diagram showing still another software specification table;

FIG. 24 is a diagram showing another search condition entry screen through which a second kind of search conditions are entered to the personnel information management system;

FIG. 26 is a diagram showing a summary of matches screen; and

FIG. 27 is a diagram showing a personnel database screen.

DESCRIPTION OF THE PREFERRED EMBODIMENTS

Several embodiments of the present invention will be described below with reference to the accompanying drawings.

Figure 1:
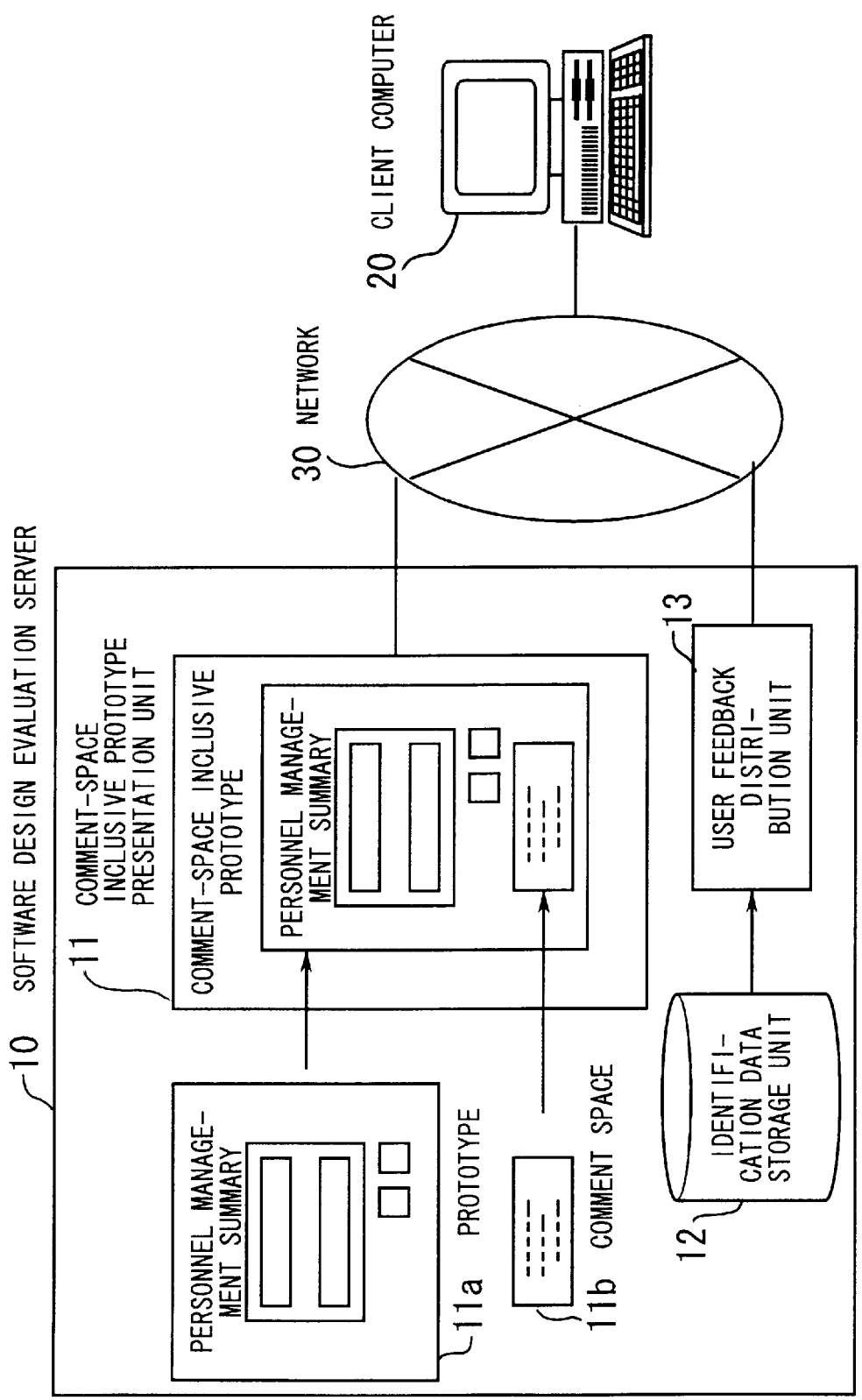
FIG. 1 is a diagram showing the principle of a software design evaluation server of the present invention.

FIG. 1 explains the concept of a software design evaluation server of the present invention. More specifically, FIG. 1 illustrates a simple client/server model comprising a software design evaluation server 10, a client computer 20 at a user's site, and a network 30 for interconnecting them. It is assumed here that a personnel management application is now in development and its prototype 11*a* is available for the purpose of evaluation of functional specifications. The software design evaluation server 10 supports prototype evaluation by the user during the process of software development.

The software design evaluation server 10 comprises a comment-space inclusive prototype presentation unit 11 which generates a special form of prototype by adding a comment space 11*b* to the original prototype 11*a* to allow the user to put his/her comments and suggestions about the proposed screens design or the items included in the prototype screens. This prototype is referred to as the comment-space inclusive prototype. The comment-space inclusive prototype presentation unit 11 sends the comment-space inclusive prototype to the client computer 20 via the network 30 for prototype review by the user.

The software design evaluation server 10 further comprises an identification data storage unit 12 which stores information to identify various screen designs under development and items included in each screen and to identify development engineers involved in the project.

Serving as another element of the software design evaluation server 10, a user feedback distribution unit 13 receives comments and suggestions about the screens or items from the user through the network 30, associates them with the identification data stored in the identification data storage unit 12, and distributes them as user feedback to the development engineers involved in the project.

In the present invention outlined above, the term "prototype" is defined as a software program (or application) at any development stage. Such software development starts with selection of an appropriate template system, or standard version of business applications, which is considered to be most suitable for the user's needs. The developer further implements the user's specific requests into this template system, as well as receiving the user's comments and suggestions during the development.

Figure 2:
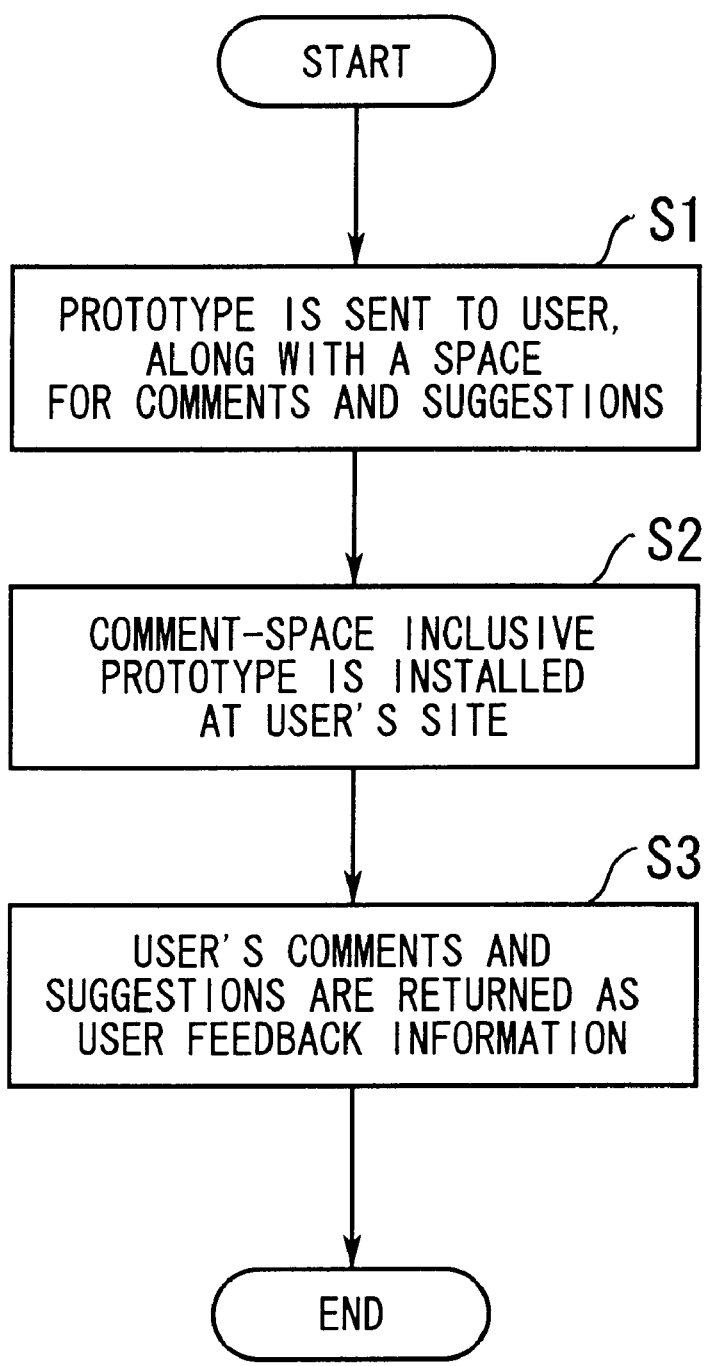
FIG. 2 is a flowchart showing an operational procedure of a first embodiment.

A first embodiment of the present invention proposes how to interact with the user to conduct a review of functional specifications for an application under development. FIG. 2 is a flowchart showing the procedure of this first embodiment.

[S1] The comment-space inclusive prototype presentation unit 11 transmits a comment-space inclusive prototype to the client computer 20.

[S2] The comment-space inclusive prototype is downloaded and installed into the client computer 20.

Figure 3:
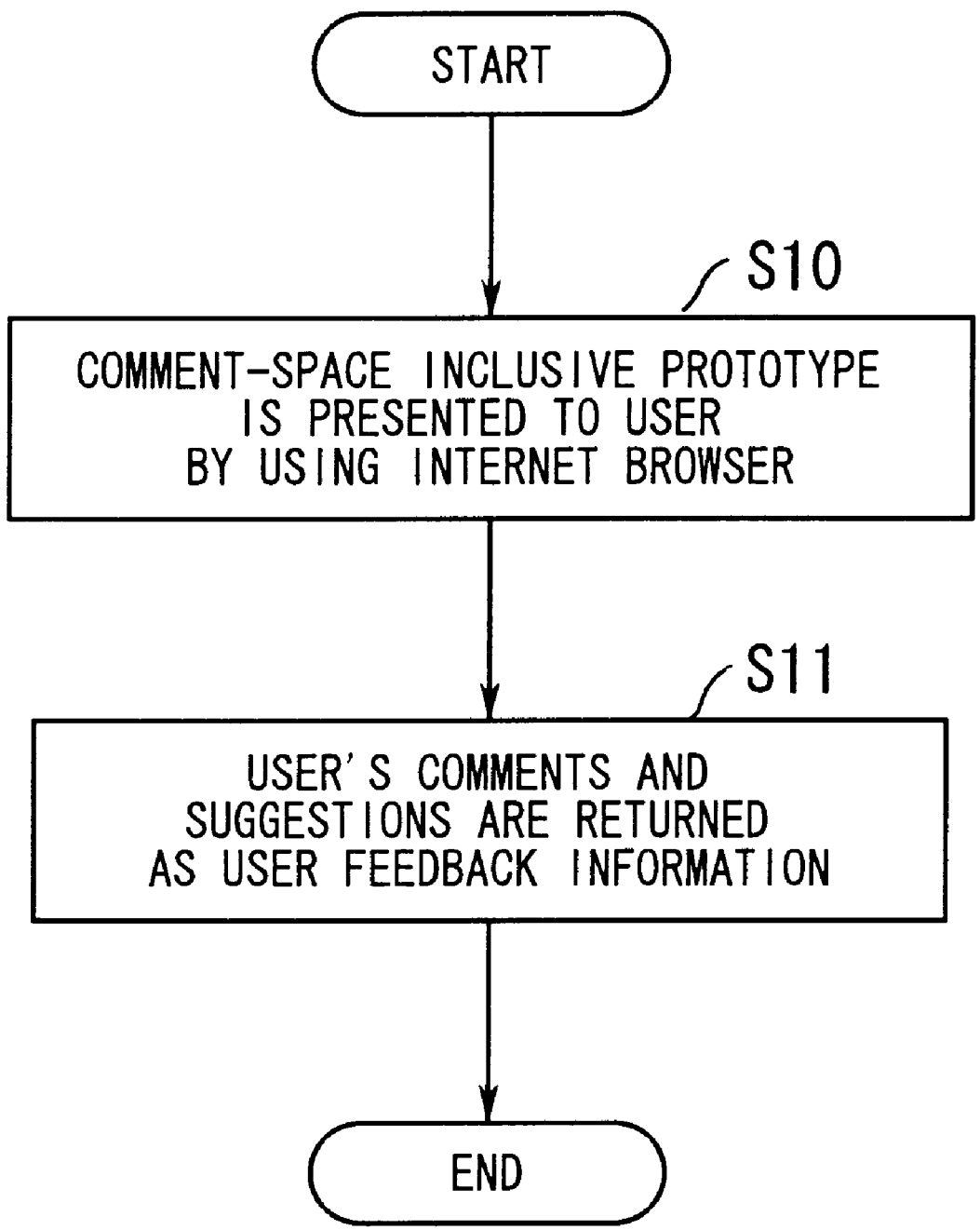
FIG. 3 is a flowchart showing an operational procedure of a second embodiment.

[S3] The prototype screens are presented to the user, along with a space for comments and suggestions. The user reviews the features implemented in the prototype screens and writes his/her comments and suggestions in the given space. The client computer 20 returns the user's comments and suggestions as user feedback information to the software design evaluation server 10. A second embodiment of the present invention proposes another method of interacting with the user to conduct a review of the functional specifications. FIG. 3 is a flowchart showing the procedure of this second embodiment.

[S10] The comment-space inclusive prototype presentation unit 11 provides the user with a comment-space inclusive prototype by using an Internet browser with Java language capabilities. (Java is a trademark of Sun Microsystems, Inc.)

[S11] The user reviews the prototype and writes his/her comments and suggestions in the given space. This user feedback information is sent from the client computer 20 to the software design evaluation server 10.

Figure 4:
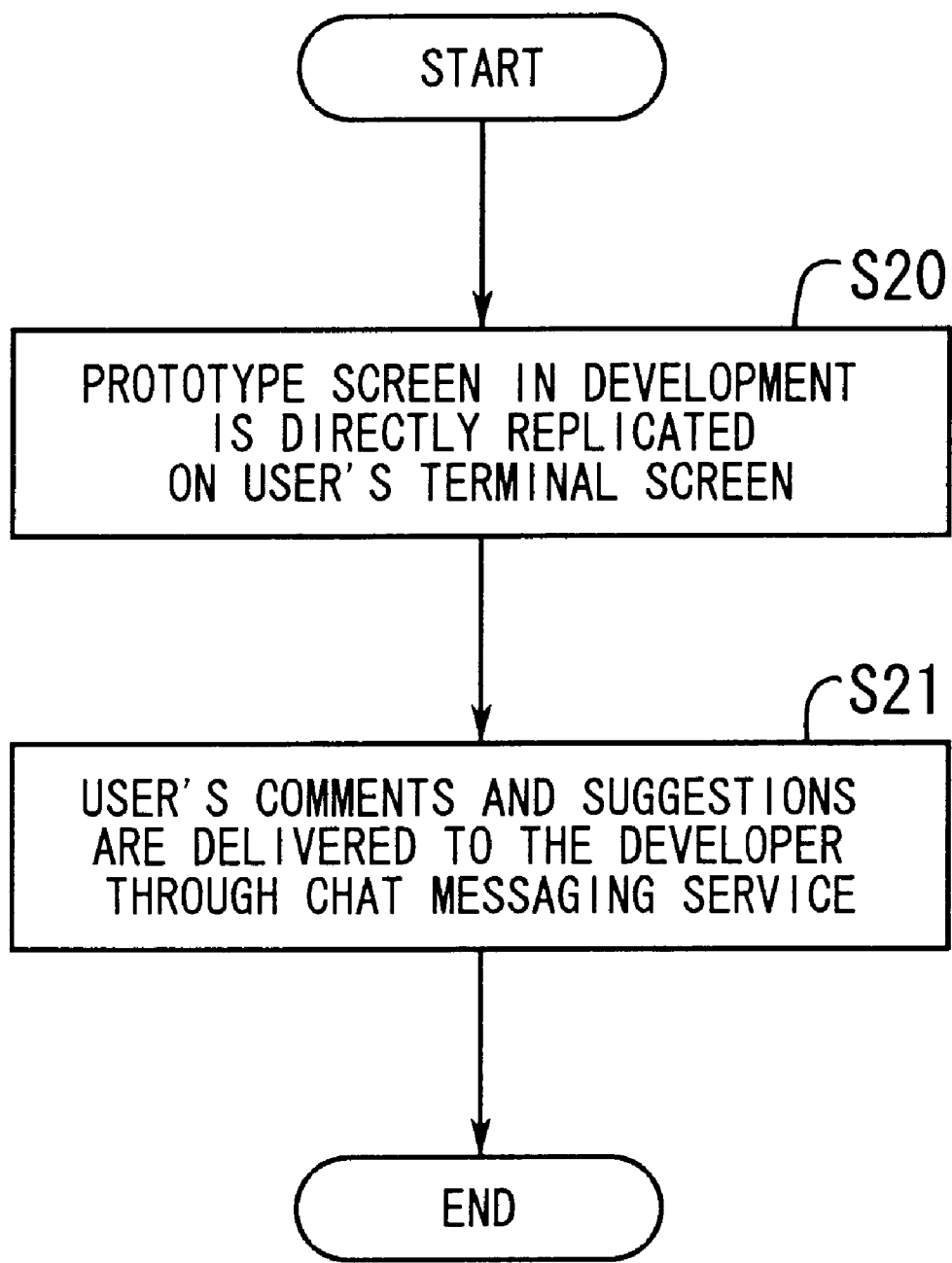
FIG. 4 is a flowchart showing an operational procedure of a third embodiment.

A third embodiment of the present invention proposes still another method of interacting with the user to conduct a review of the functional specifications. FIG. 4 is a flowchart showing the procedure of this third embodiment.

[S20] The comment-space inclusive prototype presentation unit 11 first establishes a communication link between the user's client computer 20 and another client computer of one developer who is in charge of some screens or items under development. It then makes a replica of a prototype screen now displayed on the developer's terminal and sends it to the client computer 20 for user review.

[S21] The user's comments and suggestions about the prototype screen are returned to the user feedback distribution unit 13 through a chat messaging service over the network 30, and the user feedback distribution unit 13 directly forwards them to the relevant development engineer. That is, the user can send his/her comments and suggestions to the relevant development engineer in a real-time manner.

The next few paragraphs will describe a typical screen presented by the comment-space inclusive prototype presentation unit 11 in the first and second embodiments. FIG. 5 shows an example screen 20a presented to the user for review of the functional specifications.

This example screen 20a includes two windows; one shows a prototype 11a and the other shows a comment space 11b prepared for the user to write his/her comments and suggestions on the prototype 11a. The prototype 11a shown in FIG. 5 is a personal information screen as part of an application under development, entitled the "Personnel Information Management System." The prototype 11a comprises several items such as an employee's name, address, face picture, etc.

On the other hand, the comment space 11b has a subject line to indicate the screen name "Personal Information" and the corresponding screen ID "0006." Being arranged in the form of a table, the comment space 11b has three columns for item IDs, check boxes, and comments.

The item IDs listed in the first column are the identification numbers of data items shown in the prototype 11a. For example, the face picture has a code of "001" and the employee's name has a code of "002." The check boxes in the second column are used by the user to indicate whether each item is OK or NG (No Good). The space in the third column allows the user to enter his/her comments and suggestions about the prototype 11a. Suppose that, for example, the user prefers a full-length picture to the face picture as part of the screen design. The user expresses his/her preference by marking "NG" for the item ID 001 and writing his/her instruction into the comment space, such as "Use a full-length photograph."

Figure 6:
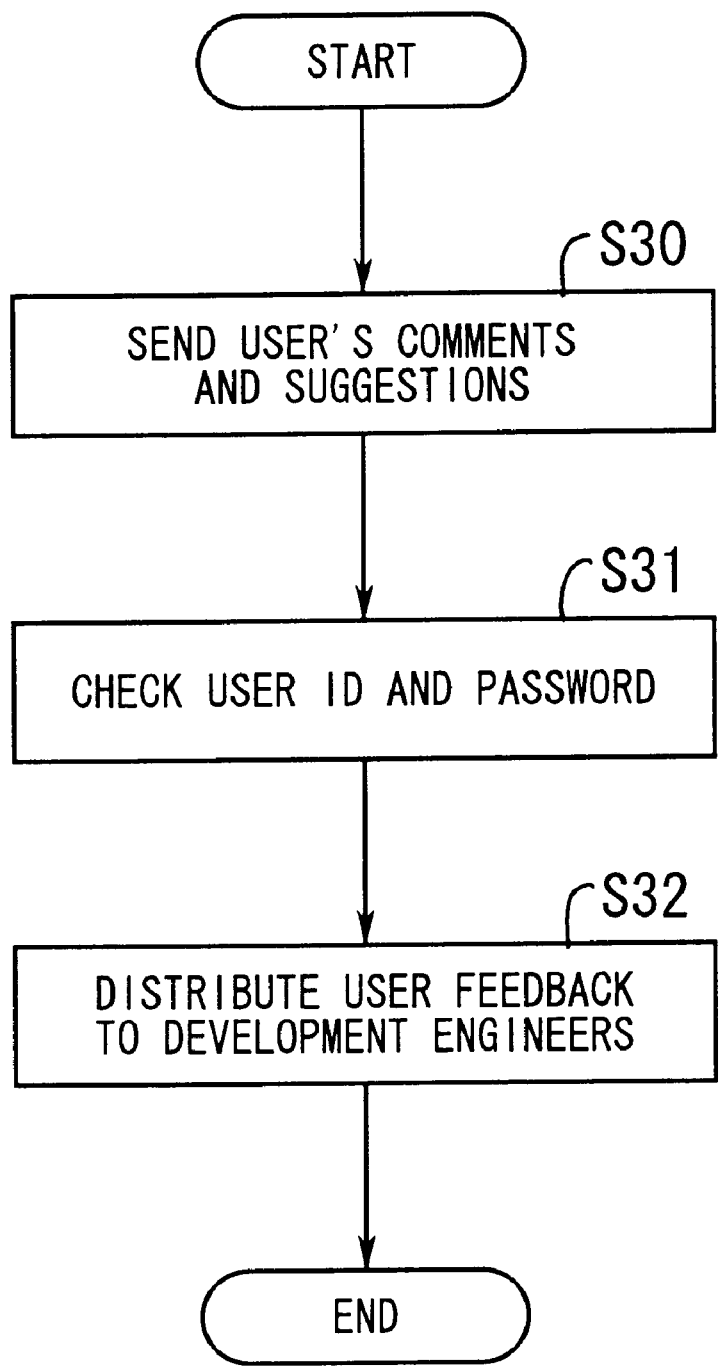
FIG. 6 is a flowchart showing a process where the user's comments and suggestions about prototype specifications are notified as user feedback and reflected in the prototype.

Once the user feedback on the functional specifications are provided, they must then be reflected in the application design. The following description will explain how this is done specifically in the first and second embodiments of the present invention. FIG. 6 is a flowchart showing this process.

[S30] The comments and suggestions given by the user are delivered from the client computer 20 to the software design evaluation server 10.

[S31] The user feedback distribution unit 13 checks the user ID and password.

[S32] With the user ID and the password, the user feedback distribution unit 13 confirms that the sender of the comments is the person who is in charge of prototype review. After this user authentication, it examines the user ID, reference number of the user feedback, screen ID, and item ID, in order to locate particular development engineers relating to the screen or items that were subjected to the prototype review. The user feedback distribution unit 13 then distributes the user's comments and suggestions to the engineers.

Figure 7:
FIG. 7 is a diagram showing how a user feedback table is associated with a development team management table.

The identification data storage unit 12 stores a user feedback table 12a and a development team management table 12b. FIG. 7 shows how these tables are associated with each other.

The user feedback table 12a stores comments and suggestions collected from the user, each of whose entries consists of a reference number assigned to each comment, screen ID, item ID, and the body of each comment. Note that the user feedback table 12a is created separately for individual user IDs. The one shown in FIG. 7 is of the user ID "USER01."

The development team management table 12b stores information on who is in charge of each screen design. Each entry of the table 12b consists of a reference number, screen ID, and developer ID.

The user feedback table 12a and development team management table 12b are associated with each other by the common values of the reference number and screen ID. For instance, the user feedback table 12a shows that a user having a user ID "USER01" has provided a comment on the screen ID0006 of the reference number 00001, and the development team management table 12b indicates that this screen is developed by a development engineer having a developer ID "B0002."

Figure 8:
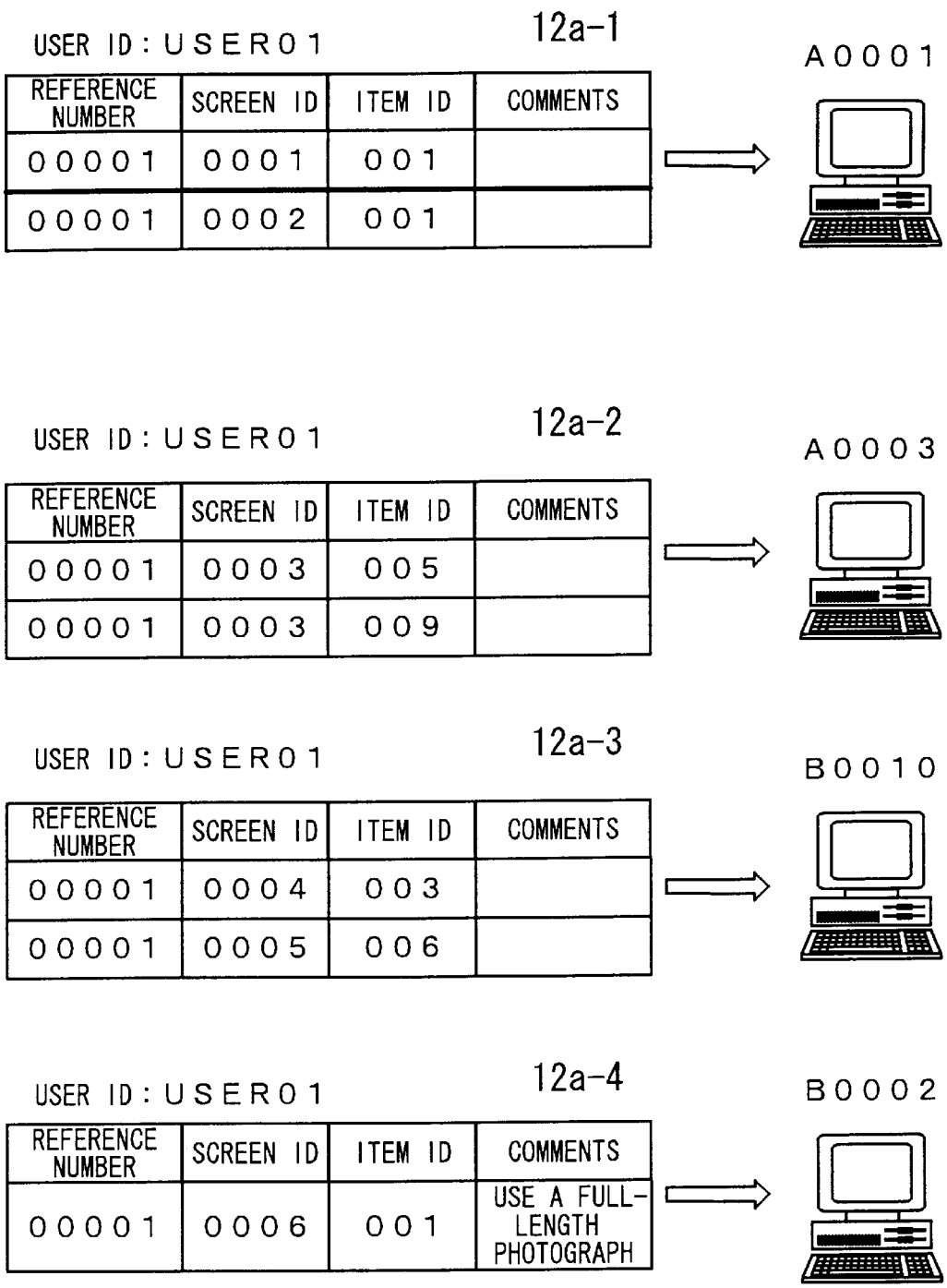
FIG. 8 is a diagram showing how the user feedback is distributed to development engineers.

FIG. 8 is a diagram showing how the user's comments and suggestions are distributed to the relevant development engineers. The user feedback table 12a in FIG. 7 is divided into four blocks 12a-1 to 12a-4 in FIG. 8, according to the developer IDs stored in the development team management table 12b. Those divided tables are distributed to four different development engineers as identified by their developer IDs. The user's comment explained in FIG. 5, for example, will be delivered to the development engineer with a developer ID B0002, since the comment is directed to the item ID 001 in the screen ID 0006. This allows the development engineer to make a modification of the screen design, so that a full-length picture will be used instead of the present face picture.

Figure 9:
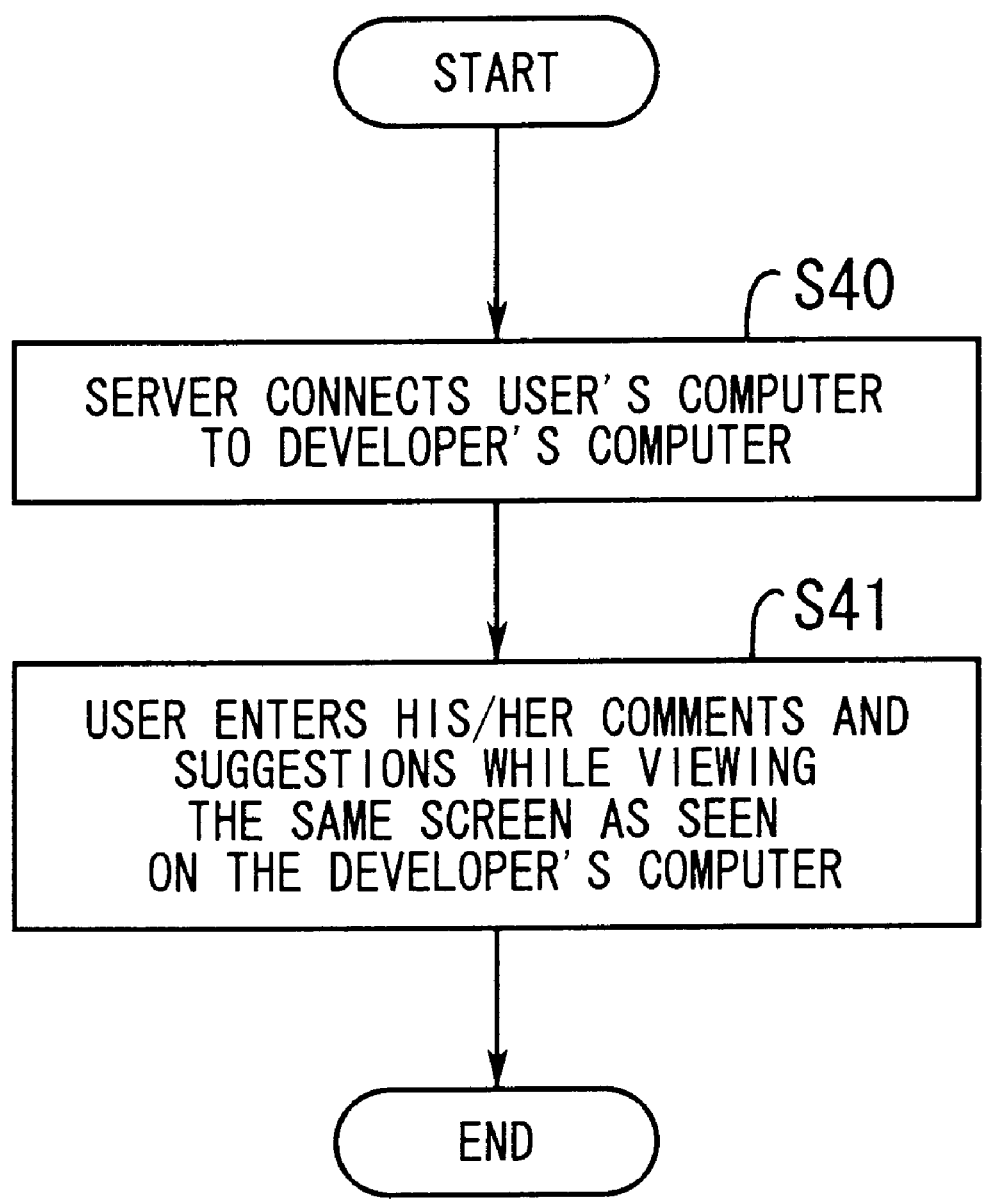
FIG. 9 is a flowchart showing how the user feedback is reflected in a prototype in the third embodiment.

Next, the following description will explain how the user's comments and suggestions on the functional specifications are reflected in the design of the prototype 11a in the third embodiment. FIG. 9 is a flowchart showing this process.

[S40] The comment-space inclusive prototype presentation unit 11 directly displays the prototype 11a on the client computer 20 by replicating what is developed on the development engineer's computer. More specifically, the personal computer at the development engineer's site is directly connected to another personal computer at the user's site over the network 30, just as in the desktop conferencing (DTC) or personal computer-based videoconferencing. The information such as user ID, reference number, and screen ID is used as parameters for this direct connection. The relevant developers can be located based on this information in the same way as described in FIGS. 7 and 8.

[S41] The user directly communicates his/her comments and suggestions to the development engineers by using a chat messaging service over the network 30, which enables what the user types to appear on the developer's computer screen in a realtime manner.

As described above, the software design evaluation server 10 of the present invention offers a prototype to the user on an online basis, along with a space for comments and suggestions, thereby permitting the user to return feedback via the network 30. The software design evaluation server 10 distributes this user feedback information on the prototype specification to appropriate development engineers to notify them of the problems that have to be solved. This structural arrangement allows software users to participate in prototype evaluation as part of a software development process in a more convenient way, and thus makes it possible to prevent any defects in functional specifications from happening to the application under development.

Figure 10:
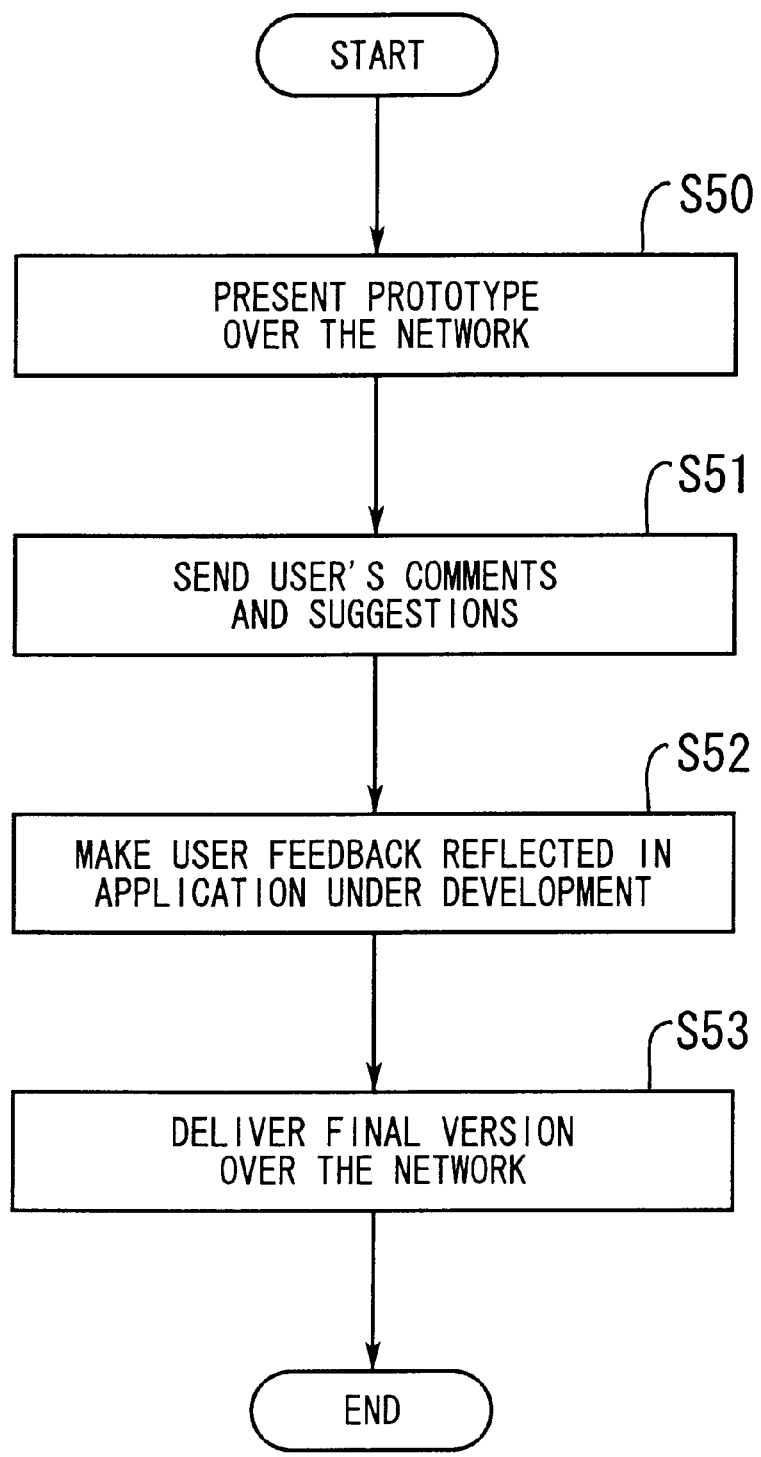
FIG. 10 is a flowchart showing a process executed by a software development method according to the present invention.

Next, a software development method of the present invention will be explained below. FIG. 10 is a flowchart showing a process executed by a software development method according to the present invention, which comprises the following steps.

[S50] A prototype software program is presented online to the user via the Internet or other networks.

[S51] The user evaluates the prototype and sends his/her comments and suggestions online.

[S52] The prototype is corrected so that the notified comments and suggestions be reflected therein. The software development advances toward the final version by repeating the above processes.

[S53] The completed software product is delivered to the user over the network and subjected to the acceptance procedure by the user.

In the software development method of the present invention, all interactions with the user are performed on an online basis, including prototype presentation, collection of user's comments and suggestions, and delivery of final products as explained above. This structural arrangement allows users to participate in prototype evaluation as part of a software development process in a more convenient way, and thus makes it possible to prevent any defects in functional specifications from happening to the application under development.

Figure 11:
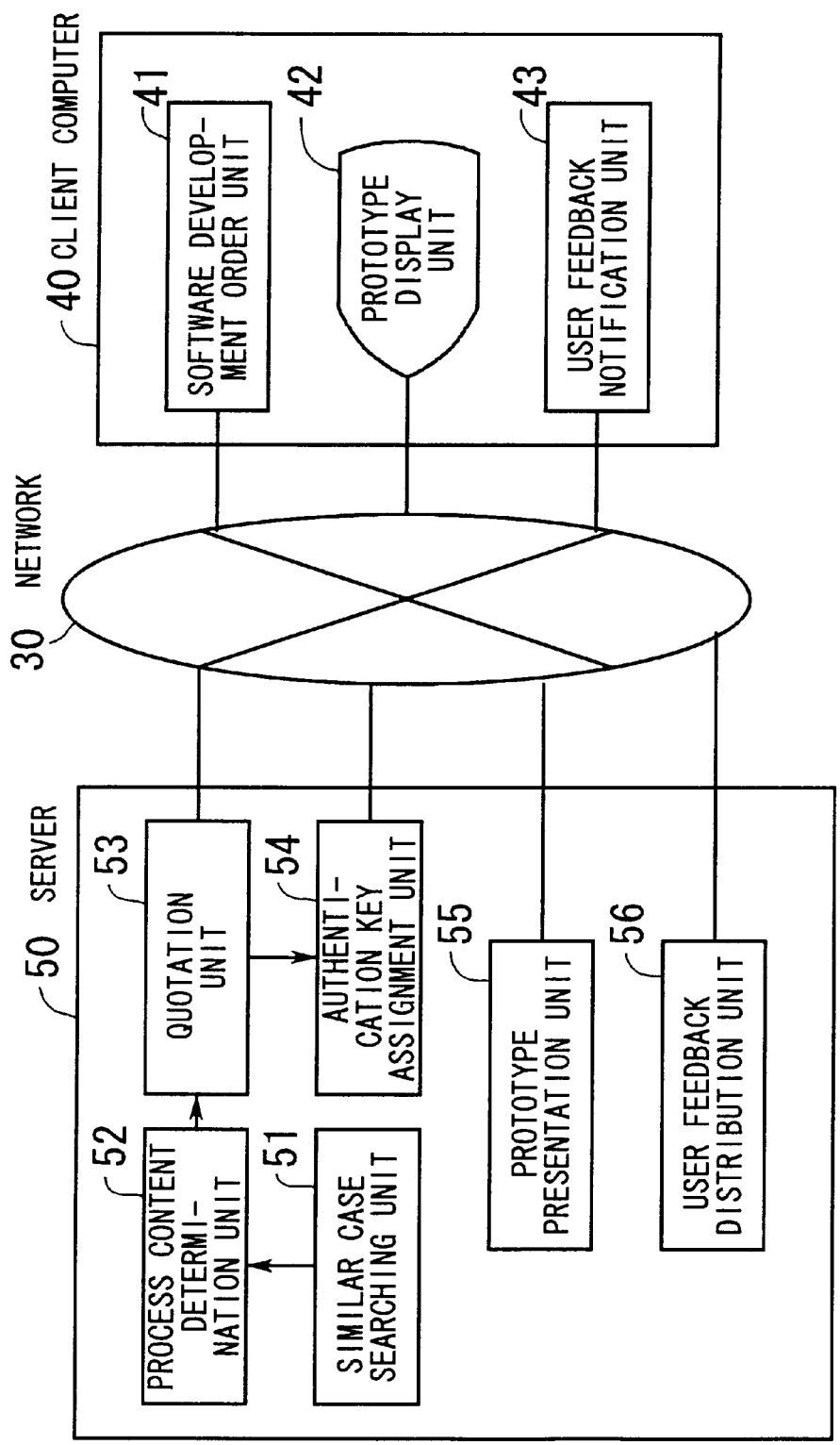
FIG. 11 is a diagram showing a concept of a software development system according to the present invention.

Next, a software development system of the present invention will be explained below. FIG. 11 shows the concept of a software development system of the present invention. This software development system takes a client/server network structure involving a client computer 40 and a server 50 to provide an improved software development environment where the developers cooperate with the users in reviewing the functional specifications of a target application in the process of software development.

The client computer 40 comprises a software development order unit 41, a prototype display unit 42, and a user feedback notification unit 43. The software development order unit 41 places an order for software development through the network 30. The prototype display unit 42 displays a prototype of the application under development on a monitor screen. The user feedback notification unit 43 accepts the user's comments and suggestions concerning the functional specifications for the prototype and sends them over the network 30.

The server 50 comprises, on the other hand, the following functional elements: a similar case searching unit 51, a process content determination unit 52, a quotation unit 53, an authentication key assignment unit 54, a prototype presentation unit 55, and a user feedback distribution unit 56. The similar case searching unit 51 accepts a software development order from the user and retrieves similar case data that may be applicable to the ordered software development. The process content determination unit 52 determines the content of a process, such as user interface screens, based on the similar case data that has been retrieved. The quotation unit 53 automatically issues a price quotation for the software development that was ordered. When the user has accepted the price quotation and the developer has made a software development contract with the user, the authentication key assignment unit 54 then submits an authentication key to the user. The prototype presentation unit 55 presents a prototype to the user over the network 30. The user feedback distribution unit 56 distributes the user's comments and suggestions collected from the client computer 40 to the development engineers in charge of the software development.

Figure 12:
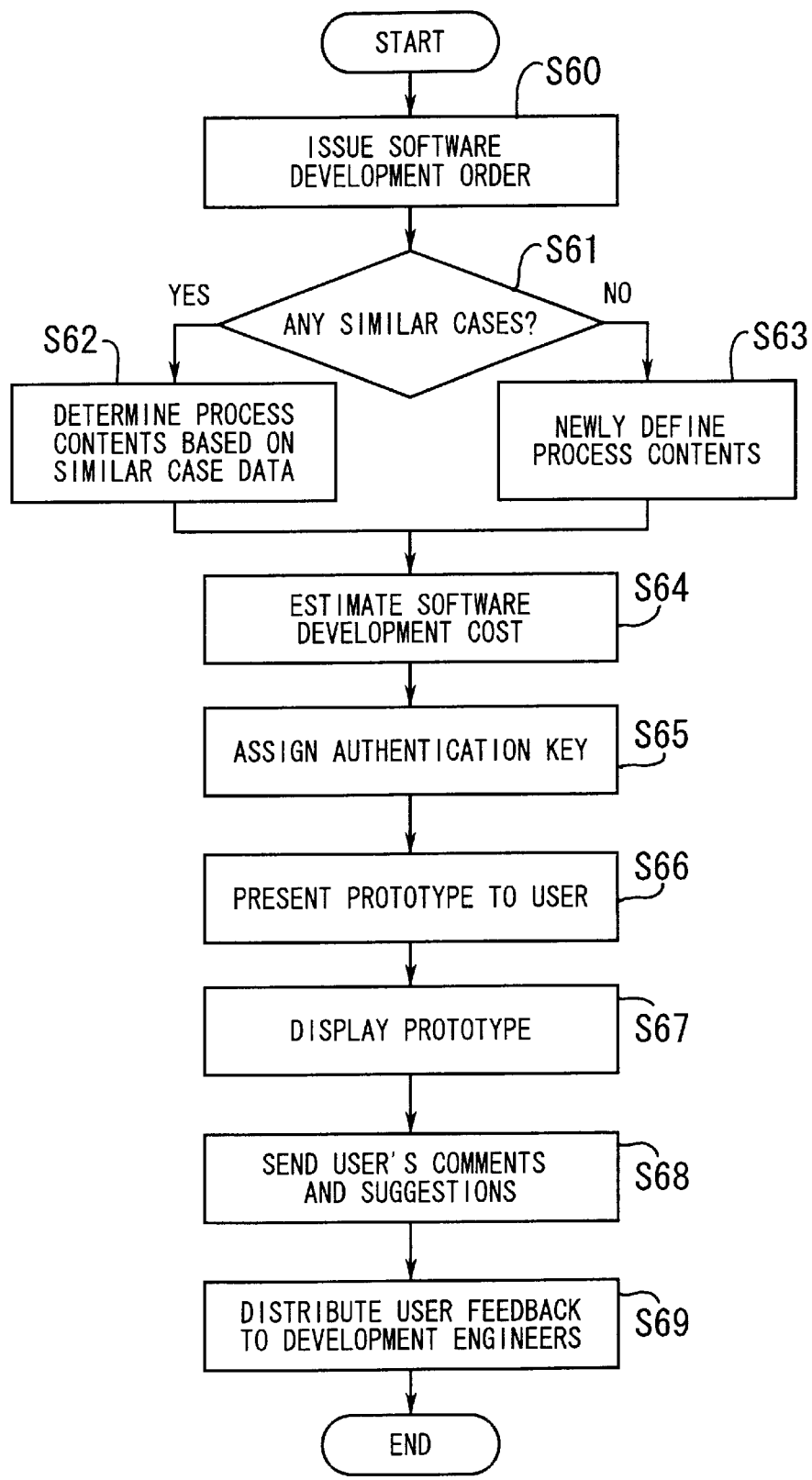
FIG. 12 is a flowchart showing a process executed by the software development system.

The operation of the above software development system is represented in a flowchart of FIG. 12.

[S60] The software development order unit 41 places an order for software development through the network 30. What is referred to as the network 30 is the Internet.

[S61] Upon receipt of the software development order from the user, the similar case searching unit 51 searches for similar case data. The process advances to step S62 if any similar case data is found. Otherwise, the process goes to step S63.

[S62] The process content determination unit 52 determines the contents of user interface screens etc., based on the similar case data.

[S63] The process content determination unit 52 newly defines the contents of the application process.

[S64] The quotation unit 53 estimates the software development cost, possible delivery schedule, and the like, and presents the quotation to the user through the network 30.

[S65] When the user has accepted the quotation and the developer has made a software development contract with the user, the authentication key assignment unit 54 gives an authentication key to the user.

[S66] The prototype presentation unit 55 sends a prototype to the user via the network 30.

[S67] The prototype display unit 42 displays the prototype on a monitor screen.

[S68] The user feedback notification unit 43 accepts the user's comments and suggestions concerning the functional specifications for the prototype and sends them through the network 30.

[S69] The user feedback distribution unit 56 distributes the user's comments and suggestions collected through the client computer 40 to the development engineers in charge of the software development.

The following few paragraphs will be devoted to the similar case searching unit 51. This similar case searching unit 51 makes a keyword search to find similar case data that matches with the application to be developed for the user. The usable keywords may include various industry classifications (e.g., manufacturing, distribution, financial, etc.), job categories (e.g., general affairs, sales, personnel affairs, etc.), names of application systems (e.g., business management, sales management, personnel management, etc.), and names of software instruments (e.g., Access, Notes, Java, etc.). (note: MS Access is a trademark of Microsoft Corporation. Lotus Notes is a trademark of Lotus Development Corporation. Java is a trademark of Sun Microsystems, Inc.)

FIGS. 13 to 15 are diagrams showing similar case tables 51a to 51c. As shown in FIGS. 13 to 15, the similar case tables 51a to 51c are structured in a normalized relational model, and stored collectively in a similar case database.

The similar case searching unit 51 retrieves similar case data out of these similar case tables 51a to 51c. Assume here that a database search is to be conducted with keywords specified as: "manufacturing" for industry classification, "personnel affairs" for job category, "Access" for software instrument, and "personnel management" for application system name. Then a search operation will proceed in the following way.

The similar case table 51a of FIG. 13 consists of reference numbers, industry classifications, job categories, application system names, and software instruments. The first entry with the reference number "00001" matches with the present search condition.

The similar case table 51b of FIG. 14 consists of reference numbers, screen IDs, and screen names, whose entries are arranged in accordance with the reference number. Take the entries with the reference number "00001" for instance. They describe that a screen with ID number "0005" is entitled "Summary Information" and that another screen with ID number "0006" is titled "Individual Information."

The similar case table 51c of FIG. 15 consists of reference numbers, screen IDs, item IDs, item names, and properties, whose entries are arranged in accordance with the screen ID. The property columns have different definitions depending on the nature of each item. For example, when an item of interest is a character string, the properties will describe whether it is expressed in Japanese or English, or in what color it should be presented. More specifically, in FIG. 15, the item "Face Picture" has a "Monochrome" property, while the item "Name" has "Japanese" and "Gothic Font" properties.

The similar case searching unit 51 searches for similar case data to deeper levels by using a data item table in the following way. FIG. 16 shows a data item table 51d, as part of a data item database, which is structured in a normalized relational model. This data item table 51d is composed of detailed data items extracted from the above-mentioned similar case database, with classification according to the names of application systems and screens that they belong to.

More specifically, each entry of the data item table 51d comprises a reference number, application system name, data item ID, data item name, properties, and implementation number. It should be noted here that this table may contain a plurality of similar entries having the same application system name. Such similar entries have different data item names or unequal attribute values depending on their implementations.

For example, the first and second entries have the same application system name "Personnel Management" and the same data item name "Name." These two similar entries, however, differ from each other in the values of property #1, or the number of characters, because their definitions depend on their respective implementations, "00020" and "00001."

For another example, the identification number given to each member of the staff is called "Employee Number" in one implementation "00020." On the other hand, the same number is called "Personnel ID" in another implementation "00001". As such, the same kind of entries may have different data item names.

As clarified above, the data item table 51d collects many detailed data items extracted from the similar case database, thus allowing the similar case searching unit 51 to determine the data items by comparing them in more detailed similarity levels. If no perfect match is obtained, the similar case searching unit 51 creates a new item and registers it to the data item database.

Next, the process content determination unit 52 will be described in detail. The process content determination unit 52 determines what the application in development is expected to do, based on the similar case retrieved by the similar case searching unit 51. The determined details of the process are then stored in the software specification database. FIGS. 17 to 19 show the software specification tables 52a to 52c as part of a software specification database that serves as the main storage for the information obtained from the users.

The software specification table 52a of FIG. 17 contains reference numbers and base implementation numbers. Here, the reference numbers are the order numbers received from users, while the base implementation numbers are the numbers of the similar case data which will be used as the basis to develop the ordered application. FIG. 17 specifically shows that a specific application with a reference number (or order number) "000001" will be developed with reference to two similar implementations "00001" and "00020" as the design basis.

FIG. 18 shows another software specification table 52b, which consists of base implementation numbers, screen IDs, item IDs, and comments, being arranged in accordance with the reference numbers. As seen in FIG. 18, this table 52b is a collection of user's comments and suggestions. Take the third entry with the base implementation number "00001" for example. It describes a change in the software specification that the item "001" should be a full-length picture.

FIG. 19 shows still another software specification table 52c, which is used for the entire system administration. This software specification table 52c contains a reference number, application system name, software instruments, databases used, and the number of users. The software specification table 52c of FIG. 19 specifically shows a project with a reference number "000001" which is titled "Personal Information Management System." This system is developed with "Access" software and makes access to "Oracle" database system, while ten users are expected to use the application. (note: Oracle is a trademark of Oracle Corporation.)

Figure 20:
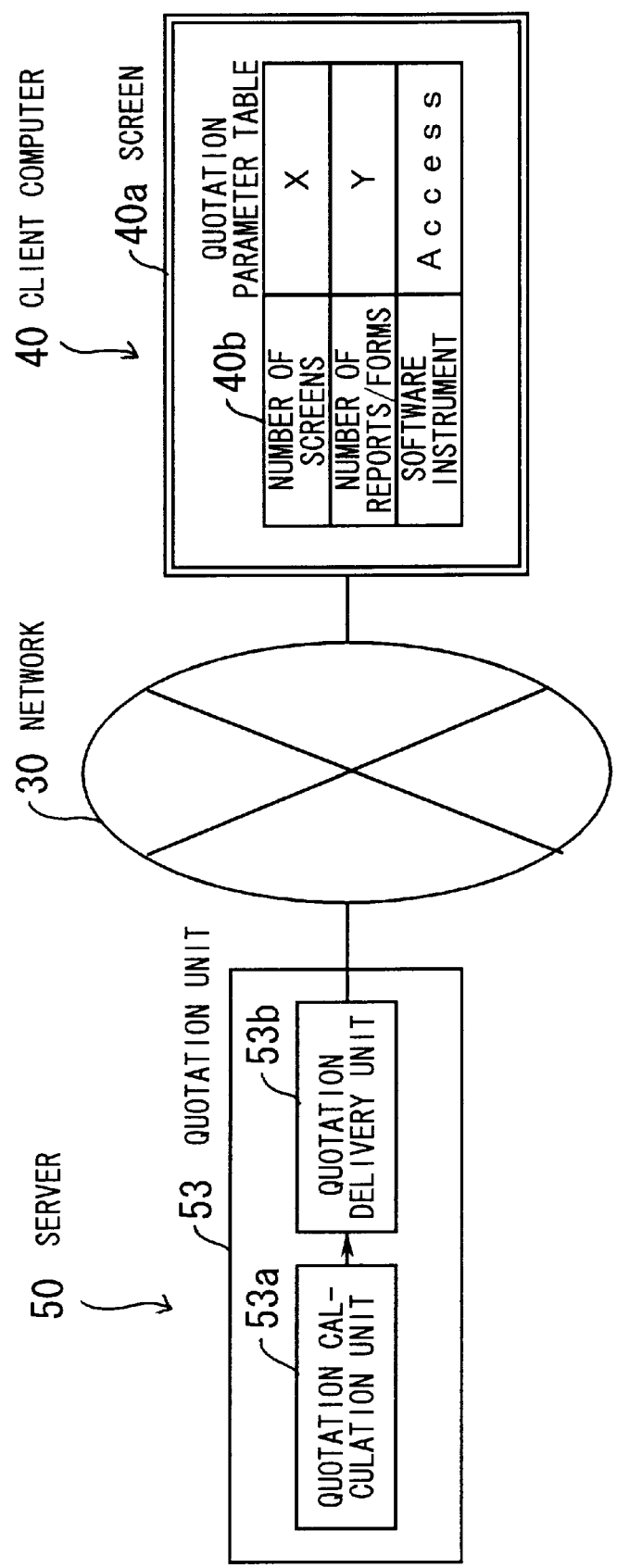
FIG. 20 is a diagram showing how a price quotation is processed by a quotation unit.

Referring next to FIG. 20, the quotation unit 53 will be explained below. FIG. 20 illustrates an entire client/server system, where the quotation unit 53 disposed in the server 50 estimates the development cost upon inquiry from the client computer 40.

At the user's site, a quotation parameter table 40b is displayed on a screen 40a of the client computer 40, allowing the user to enter the values for cost estimation. FIG. 20 shows that the user has given a first value X for the number of screens, a second value Y for the number of reports or forms, and "Access" for software instrument, to describe a new application that the user is planning to order. Based on these key parameters, the server 50 estimates the cost required for the application development.

The quotation unit 53, as part of the server 50, comprises quotation calculation unit 53a and quotation delivery unit 53b. For example, the quotation calculation unit 53a estimates the development cost by using a formula as $$Pe=(Psc \times X + Pre \times Y) \times Co \quad (1)$$

where Pe is the estimated development cost, Psc is the unit price per screen, X is the number of screens, Pre is the unit price per report or form, Y is the number of reports or forms, and Co is a coefficient that represents complexity of the process. Note that the unit price parameters Psc and Pre are dependent on what kind of software instrument is specified.

The quotation delivery unit 53b responds to the user's inquiry by supplying a price quotation calculated according to the above formula (1). The price quotation is delivered to the user in an immediate response mode via the Internet or in a delayed response mode via e-mail.

Next, the prototype presentation unit 55 will be explained below. The prototype presentation unit 55 presents a prototype to the user on an online basis, as well as informing him/her of the development progress status.

Figure 21:
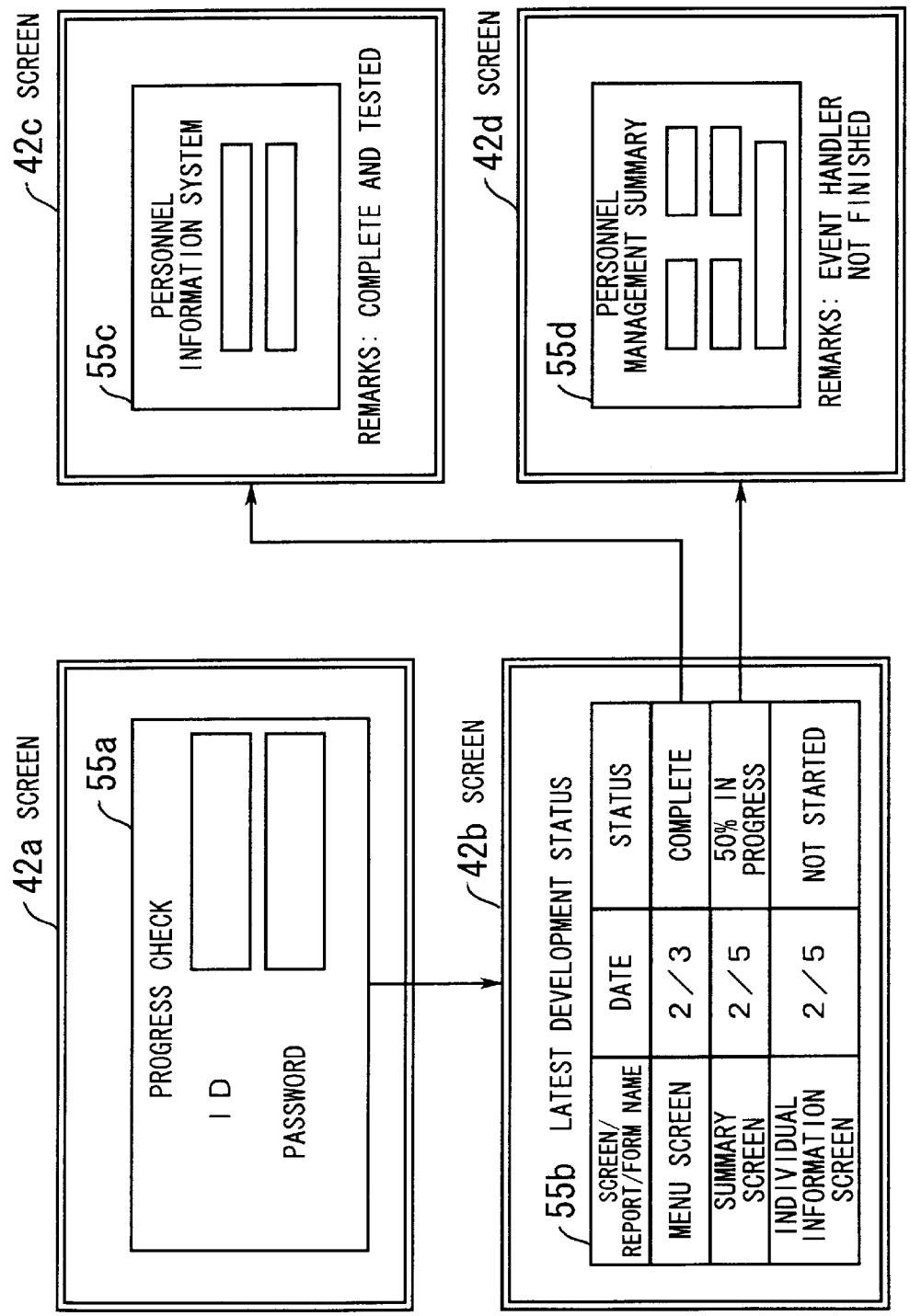
FIG. 21 is a diagram showing how a prototype presentation unit reports the development progress status and presents a prototype to the user.

FIG. 21 is a diagram showing how the prototype presentation unit 55 reports the development progress and presents a prototype to the user. First, the prototype presentation unit 55 displays a progress check dialog 55a on a first screen 42a, which dialog has text input boxes prompting the user to enter his/her user ID and password. When the user enters them and he/she is authenticated as the right person that he/she claims to be, the scene is changed to a second screen 42b.

The screen 42b shows the latest development status 55b. In FIG. 21, the latest development status 55b reports the following situations: the menu screen has been completed on February 3; the summary screen is 50 percent finished as of February 5 but still under way; and work for the personal information screen has not yet started as of February 5.

The display proceeds to a third screen 42c when the user selects the item "Menu Screen" from among those listed in the latest development status 55b. This screen 42c shows the "Menu Screen" 55c which is actually titled "Personnel Information System" along with some remarks such as "Complete and tested" given by a developer.

Referring back to the latest development status 55b, the user may select the item "Summary Screen." Then the display is changed to a fourth screen 42d, where a "Personnel Management Summary" 55d is presented along with some remarks such as "Event handler not finished" given by another developer.

Referring next to FIGS. 22 to 27, several user interface screens will be explained below as an example application developed with the software development system of the present invention. More specifically, FIGS. 22 to 27 show the screens provided in a personnel information management system.

Figure 22:
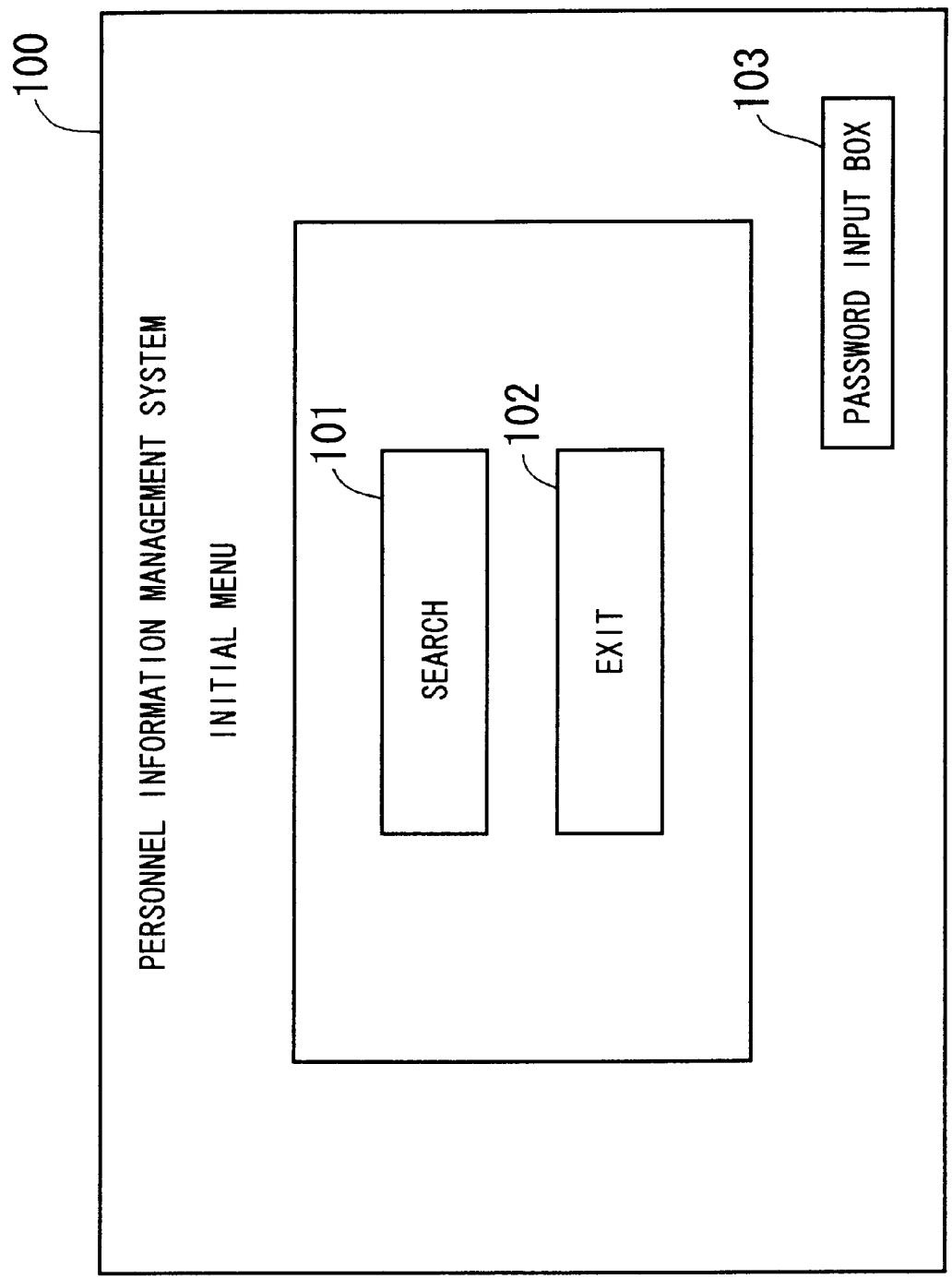
FIG. 22 is a diagram showing an initial menu of a personnel information management system.

FIG. 22 is a diagram showing an initial menu of this personnel information management system. This initial menu 100 comprises a SEARCH button 101, an EXIT button 102, and a password input box 103. The SEARCH button 101 initiates a search operation. The EXIT button 102 terminates the present session and allows the user to exit from the personnel information management system. The password input box 103 is a text field to which the user enters his/her password.

Figure 23:
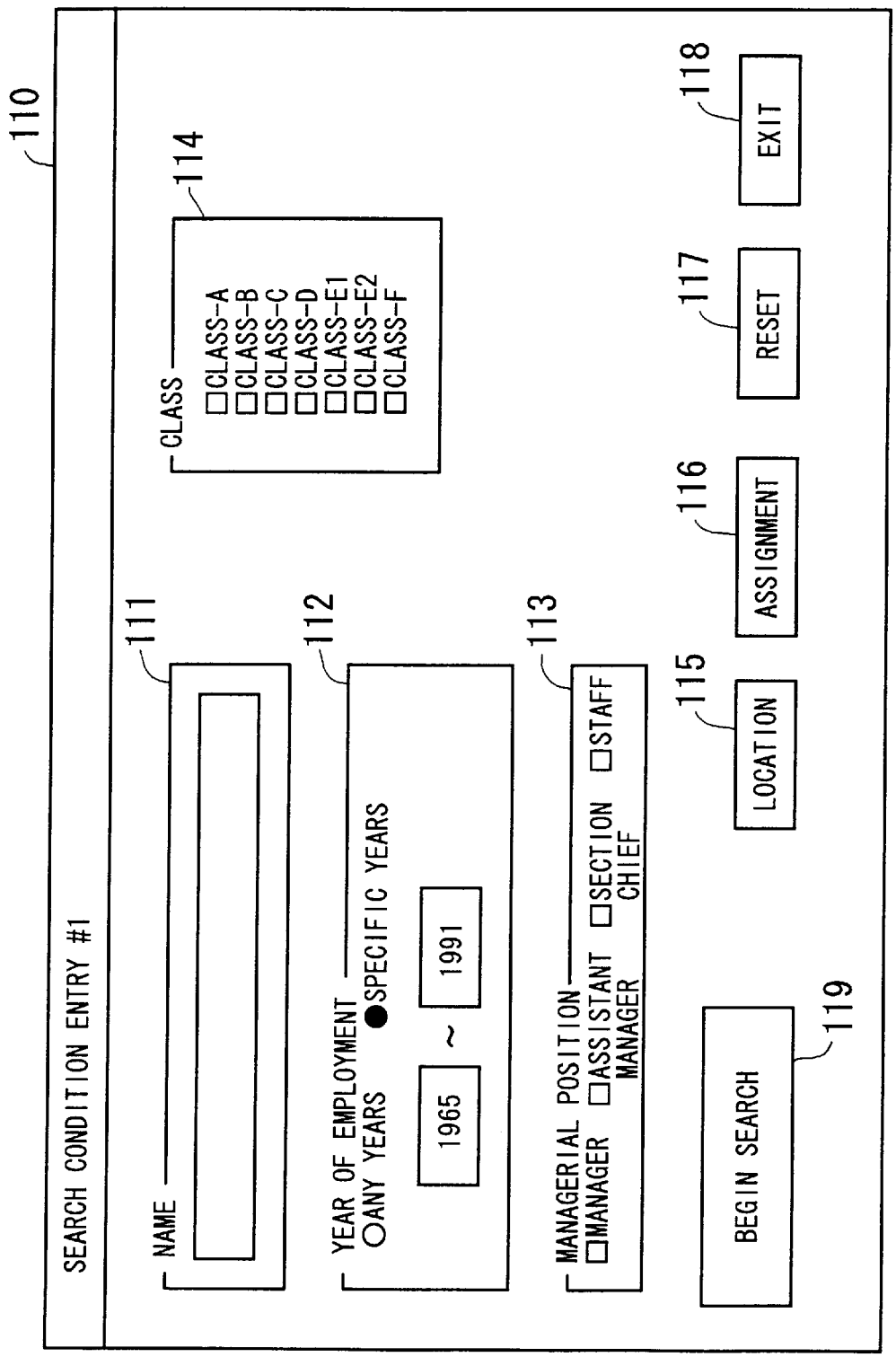
FIG. 23 is a diagram showing a search condition entry screen through which a first kind of search conditions are entered to the personnel information management system.

FIG. 23 shows a first search condition entry screen 110 where a first kind of search conditions will be entered to the personnel information management system. More specifically, the first kind of search conditions include employee name, years of employment, managerial positions, and functional classes. In the first search condition entry screen 110, a name field 111 is used to specify the name of an employee to be searched for. The user can designate a temporal search range by entering specific years to a year of employment field 112. In this field 112, the user is also allowed to select either "Any Years" or "Specific Years" option by clicking the corresponding check box. When he/she selected the "Any Years" option, the server 50 searches the records of the company's founding year through the present date. If the "Specific Years" option is selected, the server 50 only searches the records of the specified year(s). A managerial position field 113 is used to specify the managerial positions of employees to be searched for. Likewise, a class field 114 is used to designate the ratings of employees to be searched for.

A LOCATION button 115 is used to set additional search conditions about the office/factory locations where the targeted employees may be stationed. An ASSIGNMENT button 116 also allows additional search conditions to be defined, concerning the organizational units which they may belong to. These LOCATION and ASSIGNMENT buttons 115 and 116 will actually call up separate screens 120 (see FIG. 24) and 130 (see FIG. 25) which are designed for setting the extended search conditions as will be described later. A RESET button 117 clears all entry data in this screen. An EXIT button 118 allows the user to leave the search condition entry screen 110. A SEARCH button 119 starts the search operation as defined in this first search condition entry screen 110.

FIG. 24 shows a second search condition entry screen 120 where a second kind of search conditions will be entered to the personnel information management system. This second search condition entry screen 120 lists a plurality of offices and factories 121 where the targeted employees may be stationed. The user can include those locations into the search conditions by clicking each item.

OK button 122 allows the user to return to the previous search condition set screen 110 of FIG. 23 after specifying the locations in the second search condition entry screen 120. SELECT ALL button 123 selects all of the places 121, while RESET button 124 clears all the present selections in turn.

Figure 25:
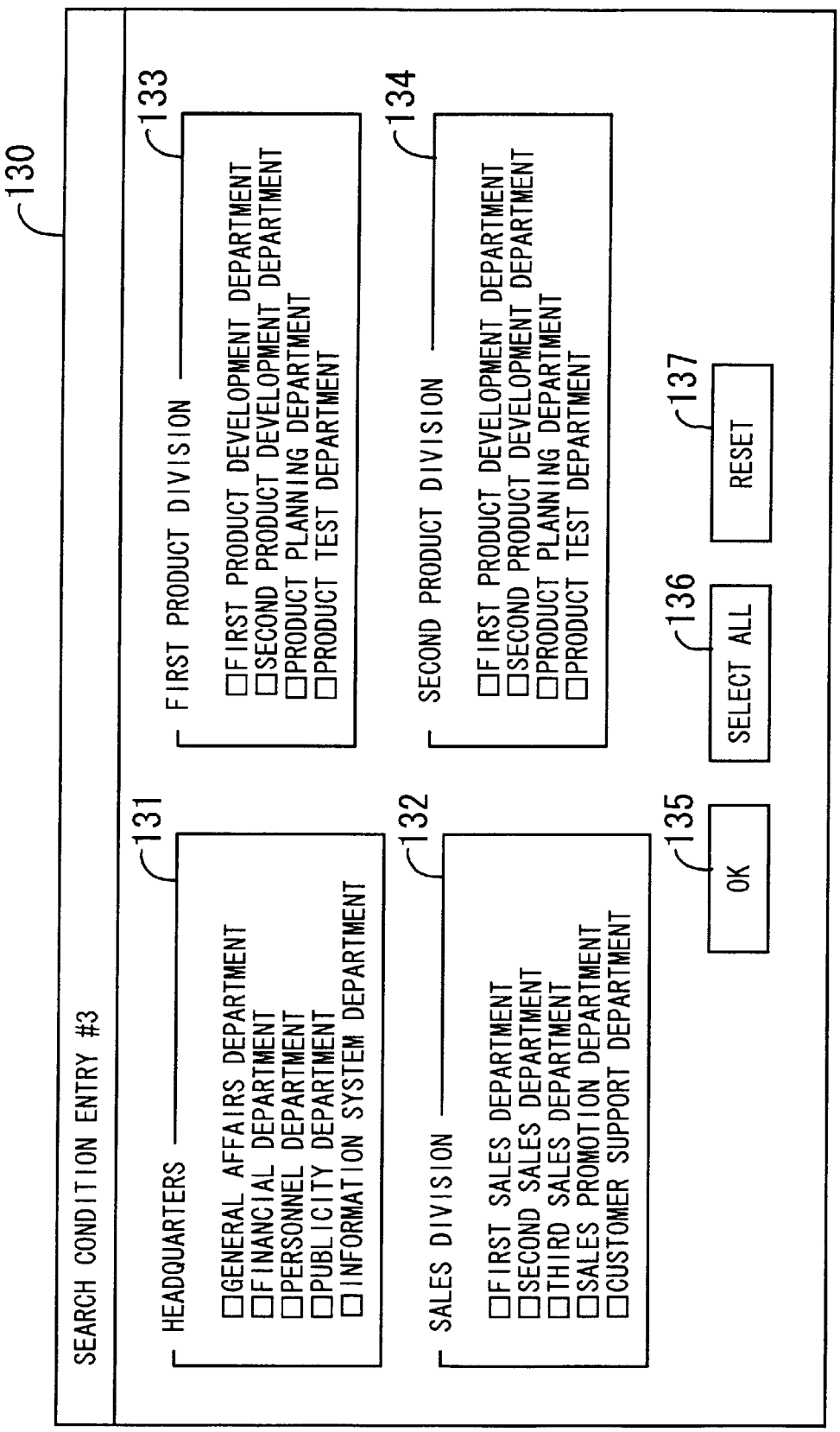
FIG. 25 is a diagram showing still another search condition entry screen through which a third kind of search conditions are entered to the personnel information management system.

FIG. 25 shows a third search condition entry screen 130 where a third kind of search conditions will be entered to the personnel information management system. This third search condition entry screen 130 lists a plurality of divisions and departments. A headquarters field 131 contains five check boxes to enable a search of individual departments in the headquarters. Likewise, a sales division field 132 contains five check boxes to enable a search of individual sales-related departments in the sales division. The first product development division field 133 contains four check boxes to enable a search of individual departments in the first product development division. The second product development division field 134 contains four check boxes to enable the search of individual departments in the second product development division.

OK button 135 allows the user to return to the previous search condition set screen 110 of FIG. 23 after specifying the locations in the third search condition entry screen 130. SELECT ALL button 136 is used to select all departments included in the headquarters field 131, sales division field 132, first product development division field 133, and second product development division field 134. RESET button 137 clears all the present selections.

FIG. 26 is a diagram showing a summary of matches screen 140. A summary of matches 141 shows individual ID codes, names, offices, assigned sections, managerial positions, and employment dates. PREVIOUS PAGE button 142 leads the user back to the previous page of the summary of matches 141. In turn, NEXT PAGE button 143 brings the user to the next page of the summary of matches 141. DETAILS button 144 calls up the detailed contents of the row of one individual code.

FIG. 27 is a diagram showing a personnel database screen 150. This screen 150 provides the user with the fully detailed information about a specific employee searched and selected by the user. NEXT PAGE button 151 and PREVIOUS PAGE button 152 allow him/her to move to the next page or previous page of the personnel database, respectively. PRINT button 153 is used to print out a personnel data table 150a that is presently displayed on the screen 150. SUMMARY button 154 takes the user back to the summary of matches 141.

As described above, the software development system of the present invention receives an online order for application development. It then searches for similar cases and issues a quotation to the user on an online basis. During the software development process, the system provides the user with some prototypes for evaluation purposes, and the user's comments and suggestions are fed back to the application under development. This structural arrangement allows the user to participate in the software development process in a more convenient way, and thus makes it possible to prevent any defects in functional specifications from remaining in the final version of the application.

The above discussion will be summarized as follows. According to the present invention, the software design evaluation server offers online a prototype to the user, along with a space for comments and suggestions, thereby allowing the user to return his/her feedback over the network. The software design evaluation server distributes the user's comments and suggestions on the prototype specification to relevant development engineers to notify them of the problems and new requests that have to be solved and implemented. This structural arrangement of the server allows the user to participate in the software development process in a more convenient way, and thus makes it possible to prevent any defects in functional specifications from remaining in the final version of the application.

Further, in the software development method of the present invention, all interactions with the user are performed on an online basis, including prototype presentation, collection of user's comments and suggestions, and delivery of final products. This structural arrangement allows the user to participate in the software development process in a more convenient way, and thus makes it possible to prevent any defects in functional specifications from remaining in the final version of the application.

Moreover, the software development system of the present invention receives an order for application development, searches for similar cases, and issues a quotation to the user, completely on an online basis. During the software development process, the system provides the user with some prototypes for evaluation purposes, and the user's comments and suggestions are fed back to the application under development. This structural arrangement of the system allows the user to participate in the software development process in a more convenient way, and thus makes it possible to prevent any defects in functional specifications from remaining in the final version of the application.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A software design evaluation server comprising:

comment-space inclusive prototype presentation means for generating a comment-space inclusive prototype by adding a comment space to a prototype of an application under development to allow an end user of the application to participate in development of the application by allowing the user to write comments about features of a screen in the prototype or data items included in the screen and for sending the comment-space inclusive prototype to a client computer, via a network, for presentation to the ultimate user;

identification data storage means for storing information identifying the screen and the data items, as well as information identifying development engineers involved in development of a corresponding screen; and user feedback distribution means for receiving comments and suggestions about the screen and/or the items from a client computer, for dividing the received comments and suggestions into comments and suggestions relevant to respective development engineers involved in the development of the corresponding screen based on the information stored in said identification data storage means, and for distributing the divided comments and suggestions to the respective development engineers involved in the development of the corresponding screen based on the information stored in said identification data storage means.

2. The software design evaluation server according to claim 1, wherein said user feedback distribution means is activated when the user has successfully presented a correct user ID and a correct password.

3. The software design evaluation server according to claim 1, wherein said comment-space inclusive prototype presentation means sends the comment-space inclusive prototype to the client computer, causes the comment-space inclusive prototype be installed into the client computer, and presents the comment-space inclusive prototype to the user after the installation is finished.

4. The software design evaluation server according to claim 1, wherein said comment-space inclusive prototype presentation means sends the comment-space inclusive prototype to the client computer using an Internet browser.

5. The software design evaluation server according to claim 4, wherein the Internet browser is provided with Java language capabilities.

6. The software design evaluation server according to claim 1, wherein said comment-space inclusive prototype presentation means establishes a communication link between a remote client computer and another client computer of the development engineer, based on the information stored in said identification data storage means, and presents the same screen as displayed on the client computer of the development engineer on the remote client computer.

7. The software design evaluation server according to claim 6, wherein said user feedback distribution means directly distributes the comments to the development engineer using a chat messaging service.

8. A software development method which allows a user to make a review of functional specifications of an application during a development process thereof, comprising the steps of:

creating a comment space inclusive prototype containing a prototype screen of an application being developed along with a comment space allowing entry of comments regarding the prototype screen;

presenting the comment space inclusive prototype to an end user over a network;

receiving the user's comments about the prototype;

sending the user's comments about the prototype over the network to a server;

dividing the comments received from the user into comments relevant to respective development engineers involved in the development of the prototype screen;

distributing the divided comments to the respective development engineers involved in the development of the corresponding screen;

correcting the application under development based on the users comments, whereby the development process advances toward a final version of the application; and delivering a final version of the application to the user via a network.

9. A software development system which allows a user to make a review of functional specifications of an application during a development process thereof, comprising:

(a) a client computer comprising software development order means for placing an order for software development via a network;

prototype display means for displaying a prototype of the application under development on a monitor screen, and user feedback notification means for sending comments and suggestions concerning functional specifications for the prototype over the network; and (b) a server comprising similar case searching means for accepting the software development order from the user and retrieving similar case data that relates to the ordered software development, process content determination means for determining contents of the application, based on the similar case data that is retrieved by said similar case searching means, quotation means for issuing a price quotation of the software development, authentication key assignment means for giving an authentication key to the user, when the user has accepted the price quotation and a software development contract has been made, prototype presentation means for presenting the prototype to the user via the network, and user feedback distribution means for distributing the comments and suggestions received from the client computer to development engineers in charge of the software development.

10. The software development system according to claim 9, wherein said prototype presentation means provides the user with development progress status of the software development in addition to the prototype.

11. A software design evaluation server, coupled to a client computer via a network, comprising:

an identification data storage storing information identifying a screen and/or data items contained therein, as well as information identifying development engineers in charge of a corresponding screen;

user feedback distribution means for receiving comments and suggestions about the screen and/or the items from the client computer through the network, for dividing the received comments and suggestions into comments and suggestions relevant to respective development engineers involved in the development of the corresponding screen based on the information stored in said identification data storage means, and for distributing the divided comments and suggestions to the respective development engineers based on the information stored in said identification data storage.

12. A software development method comprising:

displaying a prototype of the software being developed on a monitor screen to an end user;

receiving the end user's comments and suggestions regarding the displayed prototype;

dividing the received comments and suggestions into comments and suggestions relevant to respective parts of the prototype being commented on; and sending the end user's divided comments and suggestions about the prototype, including an indication of the part of the prototype being commented on, over the network to a developer of the software.

13. A software development method comprising:

receiving an order for software development;

retrieving similar case data that relates to the ordered software development;

determining the contents of the software being developed based on the similar case data;

issuing a price quotation based on the determination of contents;

presenting a prototype to users via a network;

receiving the user's comments and suggestions regarding the prototype;

dividing the received comments and suggestions into comments and suggestions relevant to respective development engineers involved in the development of the prototype; and distributing the divided comments and suggestions received from end users to respective development engineers in charge of the development of the prototype.

14. A software design evaluation server comprising:

a comment-space inclusive prototype presentation device generating a comment-space inclusive prototype by adding a comment space to a prototype of the application under development to allow the end user of the application to participate in development of the application by allowing the user to write comments about features of a screen in the prototype or data items included in the screen and for sending the comment-space inclusive prototype to a client computer, via a network, for presentation to the ultimate user;

an identification data storage device storing information identifying the screen and the items, as well as information identifying development engineers involved in the development of the application; and a user feedback distribution device to receive the comments and suggestions about the screen and/or the items from the client computer, to divide the received comments and suggestions into comments and suggestions relevant to respective development engineers involved in the development of the application based on the information stored in the identification data storage device, and to distribute the received comments and suggestions to the respective development engineers, based on the information stored in said identification data storage device.

* * * * *